Jan. 2, 1923.
H. J. MATHIAS.
SET-UP BOLT.
FILED NOV. 25, 1919.
1,440,613
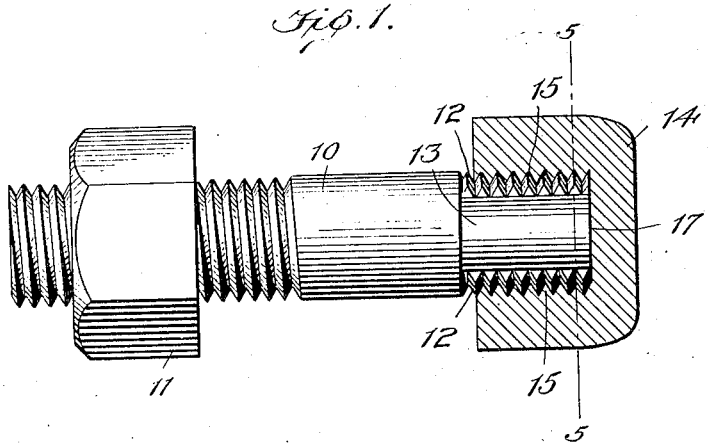
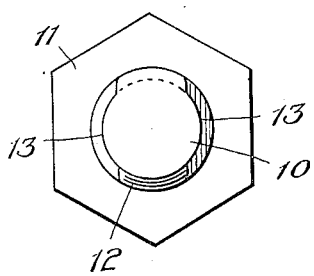
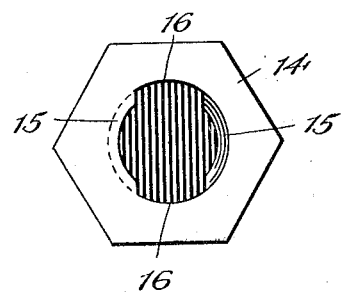
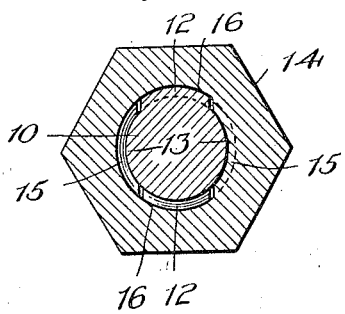
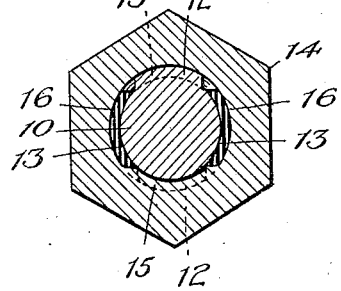
Inventor
Herbert J. Mathias,
Witness
Edwin L. Bradford
By
Attorney Patented Jan. 2, 1923.

1,440,613

UNITED STATES PATENT OFFICE.

HERBERT JOHN MATHIAS, OF RIVERSIDE, NEW JERSEY, ASSIGNOR TO MATHIAS-VAN DYKE COMPANY, OF TRENTON, NEW JERSEY, A PARTNERSHIP COMPOSED OF HIMSELF AND ELMER M. VAN DYKE.

SET-UP BOLT.

Application filed November 25, 1919. Serial No. 340,640.

*To all whom it may concern:*

Be it known that I, HERBERT JOHN MATHIAS, a citizen of the United States, residing at Riverside, in the county of Burlington and State of New Jersey, have invented certain new and useful Improvements in Set-Up Bolts; and I do hereby declare the following to be a full, clear, and exact description of the invention, such as will enable others skilled in the art to which it appertains to make and use the same.

My invention relates to bolts, but more particularly to such as are known to metal workers as setting-up bolts, and with still greater particularity to bolts of the class indicated, having a removable or quickly detachable head.

In structural iron and steel work, such for example as the fabrication of hulls for vessels in shipyards, the building of bridges, the erection of modern steel frames for buildings, the manufacture of boilers, and generally, wherever steel plates, sheets, shapes, angle-irons, beams, girders and the like are to be secured together by rivets, it has heretofore been the custom to temporarily secure such members together, and to pull or draw them into proper contact and alinement, by the employment of ordinary screw bolts and nuts. After such setting-up process the riveters follow, but obviously before a rivet can be introduced into any particular set of holes by the methods prevailing at present, it is first necessary to remove the corresponding temporary bolt, this being accomplished by means of an ordinary wrench, and the complete removal from said bolt of its threaded nut, after which it is still necessary to drive the bolt out head first, this frequently resulting in serious mutilation of the bolt threads in whole or in part. As a consequence the repair and maintenance of such bolts in a shipyard, for example, where tons of them are used, represents an item of very considerable expense.

To overcome the difficulties aforesaid is therefore an object of my present invention, by dispensing with the use of ordinary bolts having fixed heads and removable nuts.

A further object is the production of setting-up bolts comprising a novel arrangement and combination of a solid top cap-like bolt head or nut removably positioned at one end of the bolt, and an ordinary pull-up nut screw-threaded upon the opposite end of said bolt.

Other objects and advantages will appear in the following specification, and the novel features of the present invention will be particularly pointed out in the appended claims.

In the accompanying drawings which form part of this application for Letters Patent, and whereon corresponding numerals indicate like parts in the several illustrations:

Figure 1 is a side elevation of a setting-up bolt embodying one form of the present invention, and including a quickly detachable head, the latter being here shown in section;

Figure 2 is an end view of bolt with head removed;

Figure 3 is a face view of the bolt head detached, looking into its threaded interior;

Figure 4 is a transverse sectional view taken through bolt head and bolt on the line 5—5 of Figure 1, before said parts have been interlocked by a partial rotation of said head; and Figure 5 is a view corresponding with Figure 4, except that here the bolt head has been rotated sufficiently to firmly interlock it upon the inner end of bolt.

Reference being had to the drawings and numerals thereon, 10 indicates a bolt body or shank, and 11 an ordinary standard pull-up nut in threaded relation with the outer end of said shank.

The opposite end of bolt 10 is also threaded as shown by Figure 1 at 12, but, as best shown by Figure 2, the latter threads are mutilated or cut away at points diametrically opposite as at 13, 13, for purposes which will later appear.

Enclosing threads 12 at the inner end of bolt 10 is a cap-like nut 14 serving as the head of the bolt, having an unbroken solid outer end, and formed of any approved exterior configuration, size and material, threaded interiorly as at 15 to correspond with the bolt threads 12, and like the latter also mutilated or cut away at 16, 16, Figure 4.

The foregoing being substantially the construction of my invention its use and operation may be briefly set forth as follows:

Because of the mutilation of threads 12 upon opposite sides of the bolt 10, and of a like mutilation of threads 15 at opposite sides of the interior of the bolthead 14, it will be observed that in the present illustrations the exterior of the bolt at its inner end, and the interior opening of its removable head 14, are each substantially elliptical in cross section. When therefore, the hollow detachable head 14 is introduced over the inner reduced and substantially elliptical end of bolt 10, with their major diameters in a common plane, it is quite obvious that there is no engagement of threads, but on the contrary cap or head 14 instantly seats itself and abuts upon the extreme inner end of the bolt, as shown at 17, Figure 1, the parts then being in the relative positions shown by Figure 4.

It being desired now to securely interlock the bolt head and bolt, this is quickly accomplished by a quarter turn of the former, from the position shown by Figure 4 to that shown by Figures 5 and 1, whereupon all threads are instantly engaged, the head 14 being thus securely but at the same time detachably, jammed upon the end of its bolt.

In operation the bolt is used very much as ordinary bolts are used for setting up purposes, but after serving this purpose it may be instantly removed without injury to the parts and without any appreciable loss of time in the following approved manner.

Head 14 is first rotated about one-quarter turn until all threads 12 and 15 are disengaged whereupon said head is removed bodily and without obstruction, a blow of a hammer then instantly drives bolt 10 and nut 11 bodily from the rivet holes which then as quickly receive the final rivet in the usual manner.

This being a description of my invention in its best form of construction at present known to me, it should be clearly understood that I do not consider myself limited to the same. The form shown and described is rather an exemplification of the invention, involving in combination a set-up bolt having a threaded shank, an instantly detachable hollow head, and means for instantly interlocking said threaded shank and head.

As shown by the present drawings, the detachable head is a solid head of cap-like formation having a threaded pocket in its center which does not go completely through, but leaves a solid top to the head so that there will be a solid surface for the bolt end to butt against thus insuring greater mechanical strength to the assembled bolt. The thread is omitted or removed for a certain distance on the two opposite sides of the hole, leaving a certain percentage of thread of the original or ordinary size, the balance of the hole being smooth and of greater diameter than the threaded portions. Likewise, as shown, the bolt-shank is threaded upon its inner, or head, end for engagement of the detachable head, and here also a certain percentage of the thread on this end is omitted or removed at opposite sides, the area of threads omitted or removed corresponding to that of the threads in the detachable head.

Obviously, however, it is quite within the spirit of my invention to omit or remove threads from the bolt-shank and from its cooperating detachable head at other than the positions shown by the present illustrations and still to accomplish substantially the same results, and likewise the cross sectional area of the bolt shank and head members respectively, may be variously altered, it being important only that a series or several series of radial projections or interrupted threads, upon the interior of a detachable head, be staggered with relation to a correlative series of projections or interrupted thread sections, upon a bolt shank, so that the former may clear the latter when the said head is slipped over the end of said shank to enclose it and so that a partial rotation of said head will serve to interlock its said projection or thread sections beneath the corresponding projections or thread sections of the shank member.

Having thus described my invention what I now claim and desire to secure by Letters Patent is:

1. A setting-up bolt including a bolt shank and a quickly detachable bolt head provided upon their mating surfaces respectively with projections arranged and adapted to pass freely as said parts are moved longitudinally into assembled relation and to interlock when either of said parts is rotated, in combination with a pull-up nut threaded upon the opposite end of said bolt shank.

2. A setting up bolt including a bolt shank and a quickly detachable bolt head provided upon their mating surfaces respectively with interrupted screw threads arranged and adapted to pass freely as said parts are moved longitudinally into assembled relation and to interlock when either of said parts is rotated, in combination with a pull-up nut threaded upon the opposite end of said bolt shank.

3. A setting up bolt including a bolt shank having an exterior screw thread upon its inner end interrupted by longitudinal smooth surfaces of less diameter, a quickly detachable bolt head having screw threads upon its interior similarly interrupted by longitudinal smooth surfaces of greater diameter, in combination with a pull-up nut threaded upon the opposite end of said bolt shank.

4. A setting-up bolt including in combination a bolt shank threaded upon both ends, a bolt head of cap-like formation threaded upon one end of said shank and adapted to bottom on the extremity thereof, and a pull-up nut threaded upon the opposite end of said bolt shank.

5. A setting-up bolt including in combination a bolt shank, an unbroken screw thread cut upon one end of said shank, a screw thread upon the opposite end of said shank interrupted longitudinally, a quickly detachable bolt cap adapted to bottom on the end of said shank having interior threads similarly interrupted whereby said interrupted threads upon said shank and cap are adapted to pass freely as these parts are moved longitudinally into assembled relation and to interlock when either of said parts is rotated, and a pull-up nut threaded upon the opposite end of the bolt shank.

6. A setting-up bolt comprising a shank, a nut mounted upon one end thereof, a head on the other end of said shank adapted to be clamped thereon by tightening the nut against work between said head and nut, and means for quickly releasing the head from such clamped position independently of said nut and rendering said head slidably adjustable longitudinally of the shank.

7. The combination with a bolt having a threaded shank, of a quick gripping and releasing nut associated with the threaded portion of the shank, and a compression nut mounted on said shank.

8. The combination with a bolt having a shank provided with interrupted threads, of a pair of independent nuts on said shank arranged to engage the opposite sides of the work, one of said nuts having its threads interrupted and arranged for free sliding movement on the shank to permit the quick adjustment thereof in engagement with the work, the other nut being adapted to be slowly and forcibly moved into engagement with the work.

9. The combination with a bolt having a threaded shank provided with diametrically opposed longitudinally extending grooves interrupting said thread, of a pair of independent nuts on said shank arranged to engage the opposite sides of the work, one of said nuts having a threaded bore provided at diametrically opposite points with longitudinally extending grooves interrupting said threads, whereby said nut is permitted free sliding movement on said shank, the other nut having an uninterrupted thread formed in the bore thereof.

10. The combination of a bolt including a threaded shank having a pair of diametrically opposite longitudinally extending grooves formed therein, a quick adjusting nut having its threaded bore provided with a pair of diametrically opposed longitudinally extending grooves, means for limiting rotation of said nut to engage said shank and a second nut having its bore provided with an uninterrupted thread.

11. A setting-up bolt comprising a shank, an adjustable nut on one end of the shank, and a head on the other end of said shank, said head being releasable from said shank by a partial rotation and freely slidable longitudinally of said shank after its release therefrom.

12. A setting-up bolt comprising a shank, having a plurality of spaced lateral projections on one end thereof, a quick-releasable head having a plurality of spaced projections adapted to interlock with said projections on the shank, said head being adapted to slide longitudinally of the shank with its said projections passing between the projections on said shank, said projections on the head interlocking with the said projections on the shank to prevent longitudinal sliding of the head on the shank upon a partial rotation of said head, and an adjustable nut on the other end of the shank.

13. A setting-up bolt comprising a shank, an adjustable nut on one end of the shank, a head on the other end of said shank, said head being releasable from said shank by a partial rotation and freely slidable longitudinally of said shank after its release therefrom, and means for limiting rotation of said head.

14. A setting-up bolt comprising a shank threaded at both ends, a nut threaded on one end of said shank and longitudinally adjustable thereon, and a head threaded upon the opposite end of the shank and adapted to release itself from the work and from the shank by a partial rotation.

15. In a setting-up bolt, the combination of a shank threaded at one end thereof and having the threads cut away at opposite longitudinal portions thereof, a head threaded on said end of the shank and having opposite longitudinal portions of the threads thereof cutaway so that upon a partial rotation the threaded longitudinal portions of the head are brought opposite the cutaway longitudinal portions of the shank and the head is released from the work and the shank and is free to slide longitudinally of the shank, means for limiting relative rotation of said shank and said head to engage each other, and a longitudinally adjustable nut on the other end of said shank opposite said head.

16. A setting-up bolt including a bolt shank and a quickly detachable bolt head provided upon their mating surfaces respectively with projections arranged and adapted to pass freely as said parts are moved longitudinally into assembled relation and to interlock when either of said parts is rotated, in combination with a pull-up nut threaded upon the opposite end of said bolt shank, and means for limiting movement of said head longitudinally of said bolt to properly position said projections on the head and bolt to admit of relative rotation of said head and bolt.

17. A setting-up bolt including a bolt shank and a quickly detachable bolt head provided upon their mating surfaces respectively with projections arranged and adapted to pass freely as said parts are moved longitudinally into assembled relation and to interlock when either of said parts is rotated, said head being cap-like in formation so that the closed end thereof engages the end of the bolt to limit longitudinal movement of the head on the bolt to properly position said projections on the head and bolt to admit of relative rotation of said head and bolt and said closed end also jamming upon the end of the bolt when the head and bolt are relatively rotated to limit said relative rotation, in combination with a pull-up nut threaded upon the opposite end of said bolt shank.

In testimony whereof I affix my signature, in presence of two subscribing witnesses.

HERBERT J. MATHIAS.

Witnesses:
    WILLIAM MATHIAS,
    J. E. DAWSON.